United States Patent
Hehemann et al.

(10) Patent No.: US 7,009,165 B2
(45) Date of Patent: Mar. 7, 2006

(54) OPTICAL DETECTION DEVICE FOR DETECTING AN INTENSITY OF A LIGHT BEAM AND FOR DETECTING DATA TRANSMITTED BY THE LIGHT BEAM

(75) Inventors: Ingo Hehemann, Hagen (DE); Werner Brockherde, Duisburg (DE); Armin Kemna, Duisburg (DE); Holger Hofmann, Neustetten (DE); Hartmut Richter, Villingen-Schwenningen (DE)

(73) Assignees: Fraunhofer-Gesellschaft zur Forderung der angewandten Forschung e.V., Munich (DE); Deutsche Thomson-Brandt GmbH, Hannover (DE)

( * ) Notice: Subject to any disclaimer, the term of this patent is extended or adjusted under 35 U.S.C. 154(b) by 0 days.

(21) Appl. No.: 10/994,793

(22) Filed: Nov. 19, 2004

(65) Prior Publication Data

US 2005/0156099 A1 Jul. 21, 2005

Related U.S. Application Data

(63) Continuation of application No. PCT/EP03/05379, filed on May 22, 2003.

(30) Foreign Application Priority Data

May 24, 2002 (DE) .............................. 102 23 201

(51) Int. Cl.
*G01J 1/42* (2006.01)
(52) U.S. Cl. .............................. 250/208.2; 250/208.1; 250/214.1; 348/302
(58) Field of Classification Search ............. 250/208.1, 250/208.2, 214 R, 214.1, 234, 201.5; 369/44.23, 369/112.26; 348/302, 304, 315
See application file for complete search history.

(56) References Cited

U.S. PATENT DOCUMENTS 4,290,122 A   9/1981   Bates et al.

(Continued)

FOREIGN PATENT DOCUMENTS

EP   0 405 760   1/1991

(Continued)

OTHER PUBLICATIONS

Linten, et al. Integrated Optical Received With Beam Localisation. Electronics Letters. May 9, 2002. vol. 38. No. 10.

(Continued)

*Primary Examiner*—David Porta
*Assistant Examiner*—Patrick J. Lee
(74) *Attorney, Agent, or Firm*—Michael A. Glenn; Glenn Patent Group

(57) ABSTRACT

An optical detection device for detecting an intensity of a light beam in a detection window and for detecting data transmitted by the light beam includes a first detection diode and an array of at least two second detection diodes in a detection window. In addition, provision is made for a first readout circuit connectable to the first detection diode, for reading out the first detection diode at a first readout speed to detect the data, and for a second readout circuit connectable to the second detection diodes, for reading out the second detection diodes at a second readout speed smaller than the first readout speed, so as to detect the intensity of the light beam. A fundamental consideration underlying the present invention is that although the provision of additional detection diodes in the detection window initially is associated with additional expense and a reduction of the surface area of the detection window which may effectively be utilized for data detection, these disadvantages are outweighed however, by the fact that this array of additional detection diodes in the detection window enables more effective and/or less expensive control of the alignment of the light beam transmitting the data with the detection window.

16 Claims, 8 Drawing Sheets

U.S. PATENT DOCUMENTS 5,566,151 A    10/1996   Bates et al.
5,701,283 A    12/1997   Alon et al.
5,774,432 A *   6/1998   Alon et al. .............. 369/44.23

FOREIGN PATENT DOCUMENTS

EP      0 556 000      8/1993
EP      1 028 412      8/2000

OTHER PUBLICATIONS

Freeman, et al. Robust Focus and Tracking Detection for Holographic Digital Versatile Disc Optical Pickup-Head Modules. Jpn. J. Appl. Phys. 1999. vol. 38. No. 3b.

* cited by examiner

OPTICAL DETECTION DEVICE FOR DETECTING AN INTENSITY OF A LIGHT BEAM AND FOR DETECTING DATA TRANSMITTED BY THE LIGHT BEAM

CROSS-REFERENCE TO RELATED APPLICATION

This application is a continuation of copending International Application No. PCT/EP03/05379, filed May 22, 2003, which designated the United States, Japan, China and The Republic of Korea and was not published in English and is incorporated herein by reference in its entirety.

BACKGROUND OF THE INVENTION

1. Field of the Invention

The present invention relates to optical detection means, such as optical scanner or pick-up systems in CD (compact disc) and DVD (digital versatile disc) equipment or optical receivers in optical transmission lines.

2. Description of Prior Art

Driven by the increasing multi-media demands with regard to photo, audio and video, the memory requirement is currently growing at an exponential rate. Optical memory systems here constitute a particularly attractive solution between magnetic tape storage media and hard discs. With access times in the range of milliseconds, which are only slightly higher than that of hard discs, optical memory systems offer the possibility of day-to-day use on the part of the end user. With tape drives, they share the property of archivability, i.e. the property that the storage medium may be replaced in the drive.

Current memory capacities of about 5 gigabytes and short-term prognoses of up to 50 gigabytes render optical storage media competitive in the area of video-recorders as well, so that it seems certain that this sector will see strong growth. All these optical memories have in common that both the writing operation and the readout of the data stored on the storage medium is performed by means of a light beam, and that in the readout a light beam modified by the storage medium in accordance with the data stored thereon, e.g. a light beam which is reflected, transmitted, or polarized, is converted to an electrical signal by an opto-electronic detector.

Further fields of application of such opto-electronic detectors are, for example, the area of optical transmission, such as in the form of a detector array with parallel transmission lines.

With all these applications for optical detectors there is a problem of fixedly mounting the optical detector in relation to the light beam to be detected so that the light beam is in optimum alignment with the optical detector. This requires, e.g., time-consuming and expensive, since precise, adjustment in the assembly of the optical device wherein the optical detector is used, or requires time-consuming and costly precautions to be taken against thermal drifts or other application-specific operational incidents, such as precautions against misalignment of the light beam relative to the optical detector, or other factors negatively influencing the readout.

An example of such optical devices are CD and DVD devices. They include a reading head, the task of which is to scan and retrieve the data from the CD or DVD storage medium. In addition to a laser diode, optics of optical devices, focus control and tracking control actuators, the reading head also includes a photodiode matrix which provides, in addition to data readout, signals for focus and tracking control. A photodiode matrix of a conventional structure is shown, e.g., in FIG. 12 and has been described, for example, in the article by M. O. Freeman et al. entitled "Robust Focus and Tracking Detection for Holographic Digital Versatile Disc Optical Pickup-Head Modules" in Jpn. Journal of Applied Physics, 1999, pp. 1755–1760. The diode matrix shown in FIG. 12 consists of four reception diodes 900, 902, 904 and 906, designated by A, B, C and D and arranged in a planar 2×2 matrix. The diode array of FIG. 12 is arranged in the reading head of the CD or DVD device so as to receive a light beam reflected from a track on the CD or DVD. In the case of a CD, the data is stored in the track of the optical disc, e.g., by a predetermined sequence of planar locations and elevations (or depressions, depending on the point of view) (so-called pits). The light beam incident on and reflected from the plate is wider than the track or the pits, so that in the reflection of the light beam focused thereon, the elevations lead to a destructive interference of the reflected light beam, so that the elevations will be recognized by means of reduced light intensity of the reflected beam, and planar locations may be recognized by an increased, or maximum, light intensity. The optics map the reflected light beam onto the diode array. From the output signals of reception diodes 900–906, the data signal from which the data stored in the track is obtained is obtained by summing up all output signals of these diodes, i.e. by offsetting A+B+C+D. As a result of the constantly increasing speed of the readout and the increasing data density, the reception diodes 900–906 must be diodes suitable for rapid readout. Such diodes will be referred to as HF diodes. The reason why more than one, i.e. four HF diodes 900–906 are provided is that the intensity distribution information obtainable from these HF diodes is used for focus and tracking control. For focus control, for example, the light beam focused onto the optical plate and reflected back therefrom is mapped via an astigmatic, e.g. cylindrical, lens onto the diode array of FIG. 12. The target distance between reading head and optical plate is specified such that a circular mapping of the light beam focused onto the optical plate results on the diode array of FIG. 12. In the event of defocusing, an elliptical deformation of the light spot mapped onto the diode array of FIG. 12 results in one of the main axes of the astigmatic lens. For distance and/or focus control, the output signals of diodes 902 and 904 and of diodes 900 and 904 are therefore added together, and the sums are subtracted from each other, i.e. (A+C)−(B+D), to detect the elliptical deformation in the event of defocusing, it being assumed that the main axes of the astigmatic lens extend along the axes x and y indicated in FIG. 12. When the astigmatic lens is aligned with the strongly refractive axis along axis x, an elliptical extension along the main axis y indicates, e.g., a distance larger than the target distance, whereas an elliptical extension along axis x indicates, e.g., too small a distance. In accordance with the focus control signal, the distance of the objective lens from the optical plate may then be adjusted by an actuator. Similarly, the signal (A+D)−(C+B) may be used for controlling tracking of the laser on the data carrier, i.e. for radially moving the reading head across the revolving optical plate. This linkage of the diodes is suitable to detect the so-called push-pull pattern caused by interference of orders of refraction generated by the elevations acting like a phase grating.

Another possibility of providing a signal for tracking control, i.e. for setting the radial position of the reading head, or the position of the reading head in the direction transverse to the track, is to arrange two additional reception diodes outside the actual HF diode array. Such a structure may be seen in FIG. 13. As can be seen, two reception diodes 908 and 910 are provided in addition to the four HF diodes 900–906. Since the tracking control requires a sampling and/or readout rate which is not too high, these reception diodes are read out less rapidly, detection diodes for slower readout being referred to as LF diodes below. These LF diodes 908 and 910 are provided to receive two light beams which are focused onto the optical plate and are reflected, in addition to the actual data readout light beam. These additional light beams are obtained, for example, from the actual laser diode being used for data readout by detraction as the first-order detraction and are arranged, in relation to the main beam, such that they are focused onto the optical plate slightly ahead of and slightly behind the main light beam in relation to the direction of the track and in a manner which is somewhat transverse to the direction of the track. In the event that the reading head is optimally aligned with the track, both additional beams of light are modulated by the pits of the track due to the finite extension of the focused additional light beams. In the event of a lateral track misalignment of the reading head, only the finite extension of one of the additional light beams is in the track, whereas the other additional light beam is not modulated. From this information, tracking control signals for radially controlling the reading head may be derived.

Both diode arrays of FIGS. 12 and 13 have in common that they are sensitive towards non-ideal positioning of the light beam due to misadjustments or thermal drifts. In addition, optical offsets due to optical variations in the substrate thickness on the storage medium and tilts of the optical plate from a target position have a negative impact on the error rate of the data retrieved, since these events cannot be detected. The result is a time-consuming and costly manufacturing process eliminating these sources of error by means of precise adjustment, expensive components and more costly tracking and focus control.

Additional problems result from the constantly increasing requirements placed upon the storage density and compactness of the optical storage plate. The finite extension of the laser spot causes, along with increasing storage density, crosstalk phenomena due to the simultaneous readout of two adjacent tracks on the data carrier. Previous detectors have offered no possibility of detecting this. Again, this results in increased error rates, since, for example, a pit which may be present on the adjacent track may lead to a false readout result if no pit is present on the track to be read out, and at the same time this restricts the track pitch on the data carrier, which, in turn, plays a decisive role in determining the storage capacity of the medium.

In addition, a disadvantage of the previous diode structures is the high expenditure required to obtain information from the light beam received about a misalignment, and/or correction signals for the latter. Subdividing the reception window into four parts, i.e. into the HF diodes 900–906, quadruples, e.g., the readout expenditure of these diodes, which for each of these diodes must evidently be designed for readout speeds suitable for reading out data. In the case of FIG. 13, the LF diodes 908 and 910 used for tracking control are based on the prerequisite of the additional optical expenditure of two beams of first-order defraction.

SUMMARY OF THE INVENTION

It is the object of the present invention to provide an optical detection means and a method for operating same, so that in addition to detecting data transmitted by the beam of light, a more effective form of aligning the light beam in an optimum manner is made possible with the optical detection means.

In accordance with a first aspect, the invention provides an optical detection device for detecting an intensity of a light beam in a detection window and for detecting data transmitted by the light beam, having
    an array having a plurality of first detection diodes in the detection window;
    an array having a plurality of second detection diodes in the detection window,
    a first readout circuit connectable to the first detection diodes, for reading out the first detection diodes at a first readout speed to detect the data; and
    a second readout circuit connectable to the second detection diodes, for reading out the second detection diodes at a second readout speed lower than the first readout speed, to detect the intensity of the light beam, wherein the array of first detection diodes is an n×n array, and the array of second detection diodes is an (n+1)×(n+1) array, both arrays being arranged such that the first detection diodes are arranged in the gaps of the array of second detection diodes.

In accordance with a second aspect, the invention provides an optical scanning device for reading out a track of an optical plate by detecting the light beam reflected from a track and modeled in accordance with data stored on the track, having
    an optical detection device for detecting an intensity of a light beam in a detection window and for detecting data transmitted by the light beam, having
        an array having a plurality of first detection diodes in the detection window;
        an array having a plurality of second detection diodes in the detection window;
        a first readout circuit connectable to the first detection diodes, for reading out the first detection diodes at a first readout speed to detect the data; and
        a second readout circuit connectable to the second detection diodes, for reading out the second detection diodes at a second readout speed lower than the first readout speed, to detect the intensity of the light beam, wherein the array of first detection diodes is an n×n array, and the array of second detection diodes is an (n+1)×(n+1) array, both arrays being arranged such that the first detection diodes are arranged in the gaps of the array of second detection diodes; and
    a controller for outputting control signals for tracking and/or focus control depending on the detected intensity of the light beam and the second detection diodes.

In accordance with a third aspect, the invention provides an optical storage device, having
    an optical plate having an optical track which has data stored thereon;
    a light-beam generator for generating the light beam;
    an optical scanning device for reading out a track of an optical plate by detecting the light beam reflected from a track and modeled in accordance with data stored on the track, having
        an optical detection device for detecting an intensity of a light beam in a detection window and for detecting data transmitted by the light beam, having
            an array having a plurality of first detection diodes in the detection window;
            an array having a plurality of second detection diodes in the detection window;

a first readout circuit connectable to the first detection diodes, for reading out the first detection diodes at a first readout speed to detect the data; and a second readout circuit connectable to the second detection diodes, for reading out the second detection diodes at a second readout speed lower than the first readout speed, to detect the intensity of the light beam, wherein the array of first detection diodes is an n×n array, and the array of second detection diodes is an (n+1)×(n+1) array, both arrays being arranged such that the first detection diodes are arranged in the gaps of the array of second detection diodes; and a controller for outputting control signals for tracking and/or focus control depending on the detected intensity of the light beam and the second detection diodes;

optics for focusing the light beam onto the track and for directing a light beam which has been reflected from the track to the detection window of the optical detection device;

a carrier for carrying the first and second detection diodes of the optical detection device, the light-beam generator and the optics; and a servo for setting a distance between the carrier and the track, and a lateral position of the carrier in relation to the track, depending on the control signal for tracking and focus control from the optical scanning device.

In accordance with a fourth aspect, the invention provides a method of operating an optical detection device for detecting an intensity of a light beam in a detection window and for detecting data transmitted by the light beam, the optical detection device having an array having a plurality of first detection diodes and an array having a plurality of second detection diodes in the detection window, wherein the array of first detection diodes is an n×n array, and the array of second detection diodes is an (n+1)×(n+1) array, both arrays being arranged such that the first detection diodes are arranged in the gaps of the array of second detection diodes, the method including the following steps:

reading out the first detection diodes at a first readout speed to detect the data; and reading out the second detection diodes at a second readout speed, smaller than the first readout speed, to detect the intensity of the light beam.

The inventive optical detection means for detecting an intensity of a light beam in a detection window and for detecting data transmitted by the light beam includes a first detection diode and an array of at least two second detection diodes in the detection window. Further, provision is made of a first readout circuit, connectable to the first detection diode, for reading out the first detection diode at a first readout speed to detect the data, and of a second readout circuit, connectable to the second detection diodes, for reading out the second detection diodes at a second readout speed smaller than the first readout speed so as to detect, e.g., the averaged intensity of the light beam.

The present invention is based on the findings that in order to achieve a reduction of the expenditure for alignment control, one must give up the previous approach to structuring optical detection devices, which either used additionally produced light beams outside of the detection window used for data detection, for controlling the alignment of the light beam transmitting the data, with the detection diodes used to detect the data, or provided the detection diodes used for detecting the data within the detection windows themselves for controlling the alignment. According to the invention, this is achieved in that in the same detection window in which the light beam transmitting the data is to be detected, provision is made not only of a detection diode used for detecting the data, but also of an array of additional detection diodes read out at a lower readout speed.

One of the considerations on which the present invention is based is that the provision of additional detection diodes in the detection window initially indeed results in additional expenditure and in a reduction of the area that may be effectively used for data detection, but that these disadvantages are by far outweighed by the fact that this array of additional detection diodes in the detection window enables more effective, or less expensive, control of the alignment of the light beam transmitting the data with the detection window. For example, in most cases it is not required, for controlling the alignment of the beam of light with the detection window, to detect the intensity of the light beam in the detection window at the same readout speed as the data rate, which is mostly high, at which the data is transmitted. This slower readout speed designed only for aligning the light beam with the detection window, however, enables that the detection diodes additionally inserted may have smaller surface areas since they can integrate, or sum up, the detected light over a longer period. Due to the slower readout of the array of additional detection diodes, the readout expenditure of these detection diodes is also smaller, and a multiplexed readout operation of this array is possible, whereby for reading out the additional array, e.g. only one additional output, or one additional pin, is required. Due to the fact that the additional diodes are arranged directly in the detection window provided for detecting the light beam transmitting the data, it is furthermore not required to produce additional light beams besides the light beam transmitting the data. Since the alignment of the beam of light with the detection window may be controlled by means of the spatial intensity distribution of the light beam transmitting the data in the detection window, the spatial intensity distribution being detected by the array of additional detection diodes, it is not required to subdivide the area of the detection window used for data detection into several parts, so that only a fast, and thus more expensive, readout circuit is required. In addition, the detection of the intensity of the light beam transmitting the data in the detection window itself by an array of additional detection diodes enables the detection of the center of intensity, which information may again be used in many applications for alternatively controlling the alignment of the light beam with the detection window.

In accordance with a specific embodiment of the present invention, a specific optical detection device as well as its advantageous application in CD and DVD equipment will be described.

Further preferred implementations of the present invention will be defined in the dependent patent claims.

BRIEF DESCRIPTION OF THE DRAWINGS

With regard to the accompanying figures, preferred embodiments of the present invention will be described below in more detail, wherein

FIG. 2b is a block diagram of the readout and control part of the optical scanning device of FIG. 2a;

FIG. 3b is a sectional plane through the layout of FIG. 3a;

FIG. 4 is a simulation result for the dark current present along the sectional plane of FIG. 3b in the layout of FIG. 3a;

DESCRIPTION OF PREFERRED EMBODIMENTS

Figure 1:
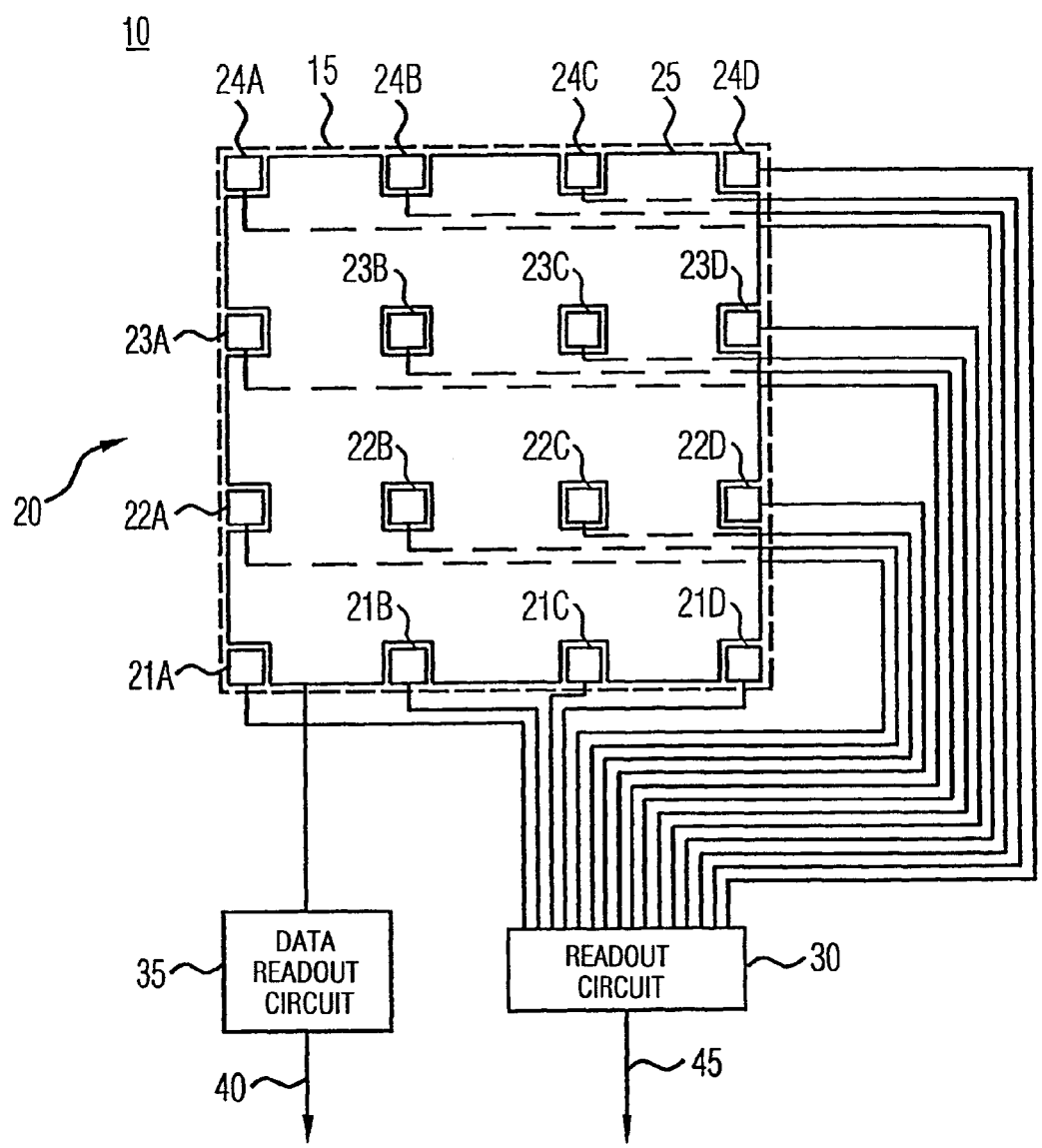
FIG. 1 is a diagrammatic representation of an optical detection device in accordance with an embodiment of the present invention.

FIG. 1 initially shows an optical detection device in accordance with an embodiment of the present invention, generally indicated by 10. In a detection window 15 provided for detecting a light beam transmitting data, the optical detection device 10 includes a 4×4 array 20 of detection diodes 21a, 21b, 21c, 21d, 22a, 22b, 22c, 22d, 23a, 23b, 23c, 23d, 24a, 24b, 24c, 24d, the second figure, respectively, indicating a line number, and the letter indicating a column number. In addition, the optical detection device 10 includes a detection diode 25 occupying, or covering, in terms of surface area, that part of the detection window 15 which is not occupied by the diode array 20. The detection diodes 21a–24d are connected to a readout circuit 30, whereas the detection diode 25 is connected to a data readout circuit 35. The readout speeds of the readout circuits 30 and 35 differ. The data readout circuit 35 has a readout speed which is sufficiently high to be able to scan the data, which are transmitted in the light beam to be detected by the optical detection device in the detection window 15, at a sufficiently high speed. The data readout circuit 35 outputs the readout signal to an output 40 in an analog form, it being possible for an A/D converter to connect to same (not shown). The readout circuit 30 reads out the detection diodes 21a–24d at a lower readout speed, and serially outputs the values read out at an output 45 in an analog form. Alternatively, both readout devices 30 and 35 may even output digital samples.

On the basis of the intensity distribution, detected by the diode array 20, of the light beam incident on the detection window 15 at the locations of the detection diodes 21a–24d, suitable action for correcting a misadjustment or misalignment of the light beam with the detection window 15 may be taken, as will be explained below in more detail.

Essentially, the optical detection device 10 of FIG. 1 consists of two parts. One part, consisting of the detection diode 25 and the data readout circuit 35, is in charge of data detection. Detection diode 25 must have a bandwidth which is sufficiently high to enable a readout speed adjusted to the data rate at which the data are transmitted in the light beam to be detected in the detection window 15.

The second part of the optical detection device 10 consists of the diode array 20 and the readout circuit 30. This part is responsible for providing information enabling optimum alignment between the detection window 15 and the light beam transmitting the data. Potential misalignments of the light beam with regard to the detection window 15 may be caused, e.g., by a misadjustment that came about during the assembly of the optical device (not shown) into which the optical detection device 10 is integrated, by thermal drifts, by mechanical shocks during the operation in the event that the optical detection device is built, e.g., into a portable CD player, or by application-induced control processes performed in connection with the readout, such as in tracking control or focusing. In comparison with the high data rate or the high readout speed, the changes in the alignment between the beam of light and the detection window 15 are slow, as experience has shown, so that for readout circuit 30, a slower readout speed in the range of, e.g., kHz is sufficient. The multiplexed signal, output by the readout circuit 30 at the output 45, the signal indicating the intensity of the light beam at the location of diodes 21a–24d, may be used, e.g., to determine the center of intensity and/or the center of the light beam in the detection window 15, which will also be referred to below as the actual position of the light beam in the detection window 15. Possibilities of determining the actual position of the light beam in the detection window 15 include, for example, a determination of that detection diode among detection diodes 21a–24d which detects the maximum intensity, an interpolation and subsequent extremal evaluation of the intensity distribution detected by detection diodes 21a–24d, the calculation of an intensity fit waveform through the intensity values detected by detection diodes 21a–24d with subsequent extremal evaluation or the like, but are not limited to same.

In addition, the information obtained from detection diodes 21a–24d may be used for detecting elliptical degeneration of the intensity distribution of the light beam in the detection window 15 which results, e.g., from using an astigmatic lens. In addition, specific circuit connections between some of the detection diodes 21a–24d arranged at specific positions, e.g. an addition or subtraction of same, may be used to counteract misalignments and/or to generate suitable control signals for application-specific events which, due to these misalignments, lead to characteristic intensity distributions at these specific positions.

With regard to FIG. 1 it shall be pointed out that this embodiment of an optical detection device may be employed in a large variety of optical devices wherein provision is made for the detection of a beam of light transmitting data. Examples of such devices include optical storage devices, such as CD or DVD equipment, but also devices wherein optical transmission lines are provided for connecting two electronic devices. Depending on the application, a variety of actuators may be used to correct the misalignment of the beam of light in the detection window. In the case of CD and DVD equipment, potential parameters, which may be set by actuators, for influencing the alignment of the laser beam in the detection window include, e.g., the radial position of the reading head in the direction transverse to the track, the distance of the objective lens from the optical plate, and a, e.g., piezo-electric lateral shift of the detection window including the entire diode array contained therein, so as to be able to also correct static misadjustments or thermal drifts.

In all these applications, the inventive arrangement of the diode array 20 in the detection window 15 promotes a more effective control of the alignment of the light beam in relation to the detection window. In the simplest case, only one single diode needs to be provided as the diode 25 detecting data, which is why what is required is only a corresponding data-readout circuit 35 adapted to the data rate of the data to be received. Readout of the slower detection diodes 21a–24d may result, as has been described above, in a serial output at an output 45, so that in the implementation in one chip, only one pin is required.

With reference to FIG. 1, it finally shall also be pointed out that the embodiment shown in FIG. 1 is only exemplary. The number of detection diodes 21a–24d of the diode array 20 may vary and may be adapted, for example, to the actuators available which may influence the misalignment, i.e. it may be adjusted to the degree of accuracy in counteracting misalignments. In the event that a misalignment of the light beam is only to be expected, e.g., along one direction or dimension, and that therefore only one actuator is provided for counteracting a misalignment along this direction, a 2×1 array of detection diodes, for example, may be sufficient. Conversely, on the data detection side, various applications, such as in the case of parallel transmission lines, wherein a diode array as a receiver is faced with a transmitter of a bundle of light beams, may require the provision of more than one detection diode 25 used for data detection. Consequently, an array of detection diodes 25 may be provided in addition to array 20, as is the case in the embodiment described with reference to the subsequent figures. Such a dual HF and LF diode array could be used in optical receivers in optical parallel transmission lines for data reception with beam alignment misalignment compensation being performed at the same time, for example as has been described in "Integrated optical receiver with beam localisation" by Linten et al. in Electronics letters, vol. 38, No. 10, which description is incorporated by reference into the present application.

Figure 9:
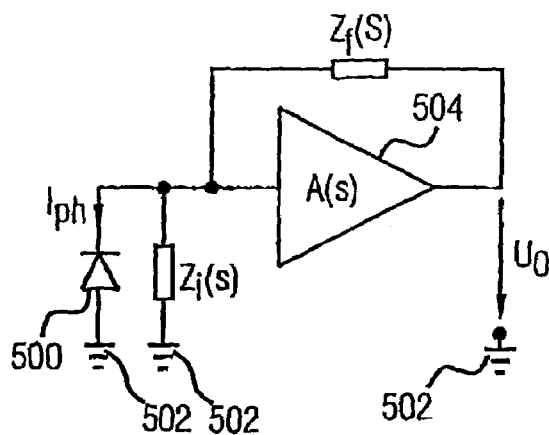
FIG. 9 is a readout circuit for reading out the HF diodes of the embodiment of FIG. 2.
Figure 10:
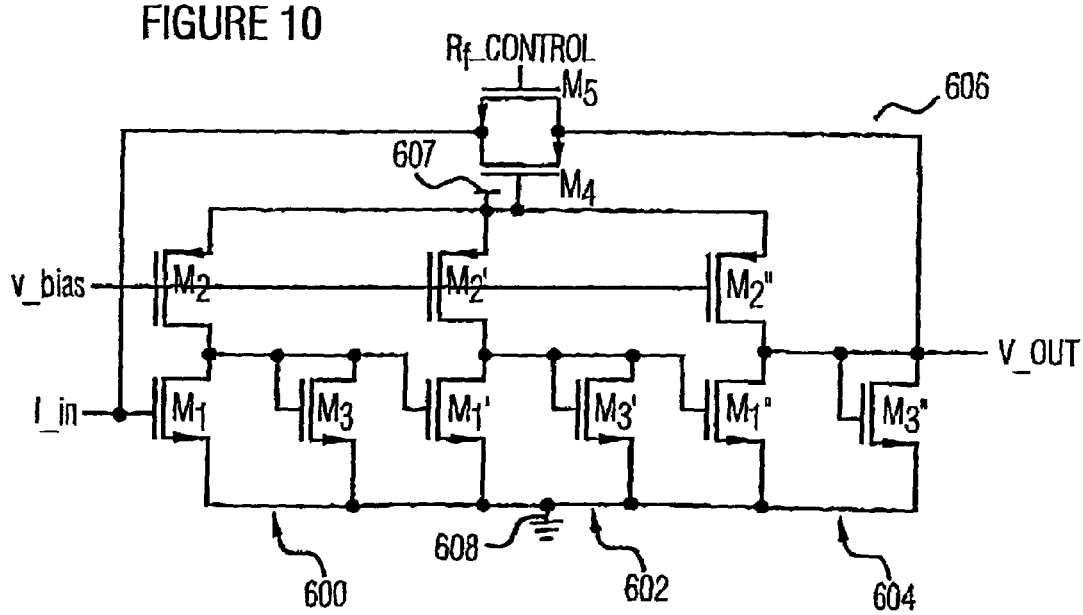
FIG. 10 is an embodiment of an amplifier circuit for the amplifier of FIG. 9.

With reference to FIGS. 2–11, an embodiment of an optical scanning device will be described below which is suitable for being implemented in conventional CD and DVD equipment, but enables additional possibilities with regard to focus and tracking control and further steps preventing misalignment of the light beam to be detected from the detection window of the optical detection device. Even though the diode array of the optical scanning device, which will be described below with reference to FIG. 2a, is also suitable for other applications, it will be described below only within the framework of its assembly into the optical scanning device against the background of being applied with CD equipment, for better understanding. Whereas FIG. 2a diagrammatically shows the diode array, FIG. 2b shows the readout and control part of the optical scanning device. FIGS. 3a, 3b and 4 to 8 show an embodiment of a realization of the diode array in CMOS technology and/or its properties, FIGS. 9 to 11 show embodiments of potential evaluation circuits for reading out the diodes of the diode array.

The optical scanning device which will be described below with reference to FIGS. 2–11 is built into a CD drive which is not shown and the structure of which is, in principle, known. The optical scanning device described below only represents the detection and readout and control signal generation part of the CD drive. In addition, the CD drive includes a drive for rotating a CD loaded into the drive as an optical plate; a laser diode as a light generation means generating a light beam; optical means; and actuators as servo-means for setting a distance between the carrier and the track, and a lateral position of the carrier in relation to the track, depending on control signals for tracking and focus control, as are determined, as will be described below, from the light beam's intensity distribution detected by the diode array. The optical means consists of optical devices, such as a collimator for collimating the laser beam, a beam-splitter which is transmissive or deflective, depending on the polarization, a 45° plate which changes the polarization direction, an objective and/or convergent lens for concentrating the collimated laser beam onto the track, to be read out, of the CD on which the data to be read out is stored, and an astigmatic lens for mapping the light beam, reflected from the track and captured by the objective lens, onto the diode array. The diode array, the laser diode and the optical means are jointly mounted on the reading head and consequently have fixed positions to one another designed such that the light beam modulated and reflected from the track is directed, via the optical means, to the diode array such that with optimal operation the light beam is arranged at a target position on the diode array of FIG. 2a, e.g. is centered. Several adverse circumstances may lead to the fact that the actual position occupied by the reflected laser beam on the diode array of FIG. 2a deviates from the target position, such as a misadjustment, a thermal drift, a lateral or beam-directional misalignment of the reading head, this deviation being counteracted, as will explained below in more detail, by the readout and control part of FIG. 2b by generating suitable control signals for the servo-means from the intensity detected by the diode array of FIG. 2a.

Figure 2A:
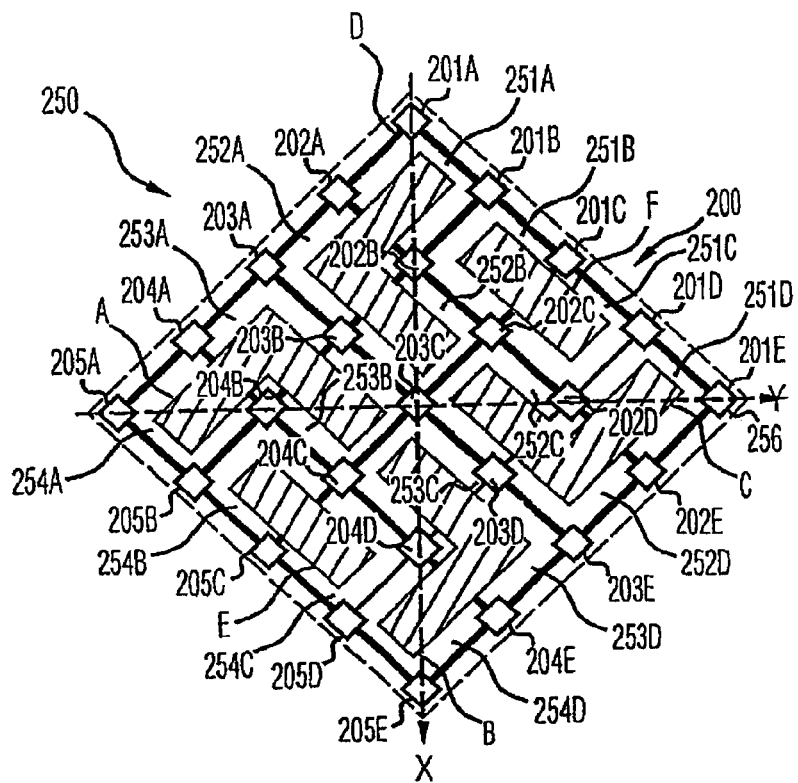
FIG. 2a is a diagrammatic representation of a detection diode array of an optical scanning device in accordance with an embodiment of the present invention.
Figure 2B:
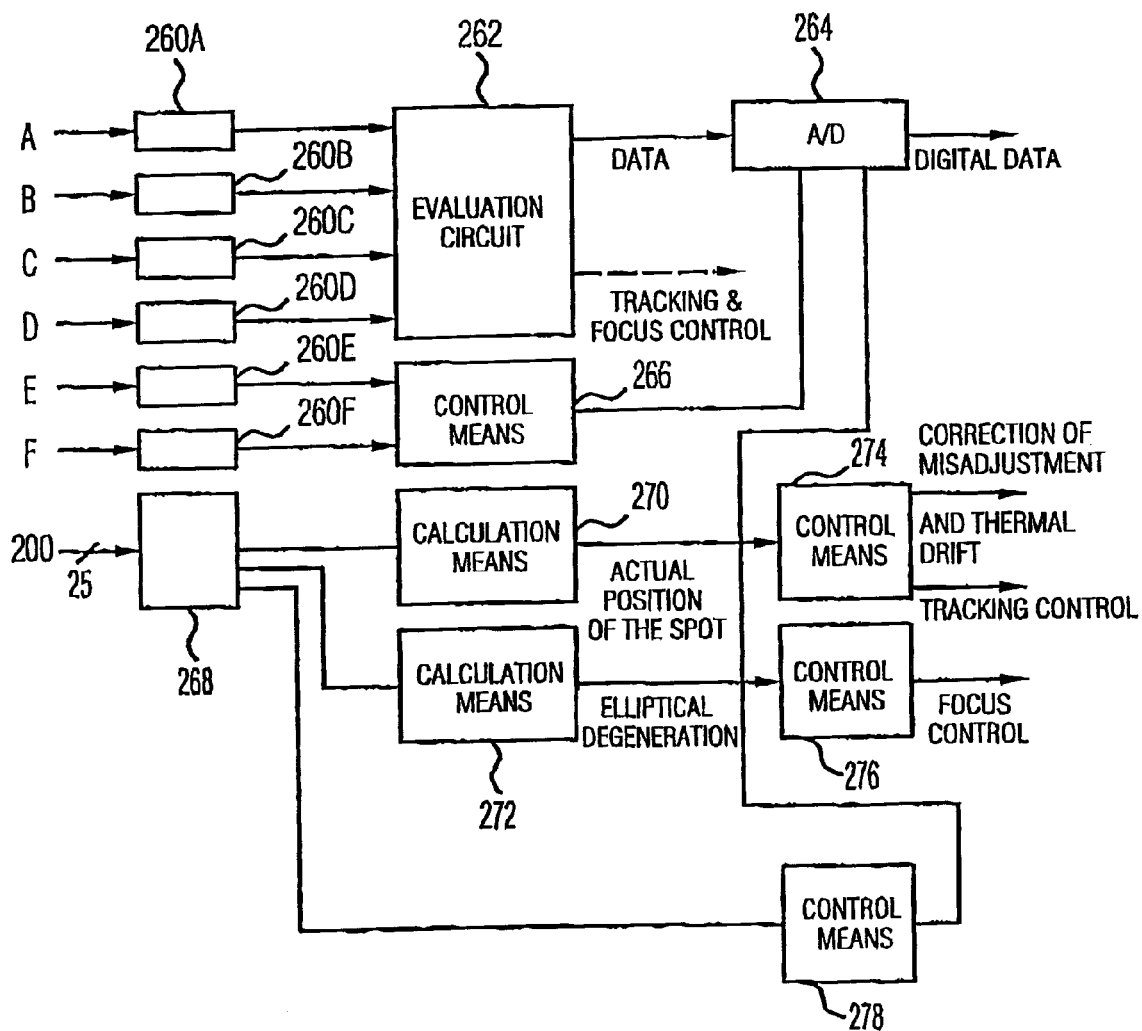

FIG. 2a schematically shows the diode array of the optical scanning device provided for detecting an intensity distribution of a light beam in a detection window and for detecting data transmitted by the light beam, and thus represents the detection part of the optical scanning device. In particular, the diode array of FIG. 2a includes a 5×5 array 200 of detection diodes 210a–210e, 202a–202e, 203a–203e, 204a–204e and 205a–205e, the last figure indicating a line number, and the letter indicating a column number of the 5×5 array. In addition, the diode array of FIG. 2a includes a 4×4 array 250 of detection diodes 251a–251d, 252a–252d, 253a–253d, 254a–254d. Both arrays 200 and 250 are arranged, in relation to each other, such that the detection diodes 251a–254d are situated in the gaps between the detection diodes 201a–205e, respectively. In other words, detection diodes 251a–254d are arranged in a face-centered manner in relation to detection diodes 201a–205e and together form a body-centered cubic arrangement. All detection diodes 201a–205e and 251–254d are jointly arranged in the same detection window 256 provided for detecting the light beam which is reflected back from the track to be read out, and is modulated by the pits of the track, so that it includes the data to be read out. The 25 detection diodes 201a–205e are individually connected to a readout circuit 268 (FIG. 2b), respectively, which reads them out in a serial manner to output the output signals of same in a multiplexed form. The detection diodes 251a–254d of the diode array 250 are connected with one another or connected in parallel to form six areas A, B, C, D, E, and F, and connected to various readout circuits 260a, 260b, 260c, 260d, 260e and 260*f* (FIG. 2*b*) exhibiting a higher readout speed than that readout speed used for reading out the detection diodes 201*a*–205*e* of the 5×5 array 200. In particular, as is indicated in FIG. 2, detection diodes 254*a*, 253*a* and 253*b* are combined to form area A, detection diodes 254*d*, 253*d* and 253*c* are combined to form area B, detection diodes 252*d*, 251*d* and 252*c* are combined to form area C, detection diodes 251*a*, 252*a* and 252*b* are combined to form area D, detection diodes 254*b* and 254*c* are combined to form area E, and detection diodes 251*b* and 251*c* are combined to form area F.

In the following, the detection diodes 201*a*–205*e* having a lower readout speed will be referred to as LF diodes, whereas the detection diodes 251*a*–254*d* having a higher readout speed will be referred to as HF diodes. The LF diodes 201*a*–205*e* which are read out serially are used to generate control signals for focus and tracking control and for controlling actuators of the CD device (not shown), which has the optical scanning device with the diode array of FIG. 2*a* built into. The HF diodes 251*a*–254*d* serve to detect the data transmitted by the light beam incident on the diode array of FIG. 2*a*. The subdivision of said diodes into areas A–F offers the possibility, as will be described below, of the diode array shown in FIG. 2*a* providing signals A–D as are also used for tracking and focus control in conventional CD devices and are devised for generating focus and servo signals on the basis of a diode array in accordance with FIG. 12. The areas E and F are arranged such that they may be used for detecting crosstalk phenomena, as will be explained below.

After having described the structure of the diode array of FIG. 2*a*, what follows is a description of that part of the optical scanning device which is responsible for reading out the diodes and generating servo signals. The currents generated in the areas A–F are, as was mentioned above, read out by readout circuits 260*a*, 260*b*, 260*c*, 260*d*, 260*e* and 260*f*, respectively, and amplified, the latter being configured, e.g., as transimpedance amplifiers, an embodiment of which will be described in more detail with reference to FIGS. 9 and 10. The outputs of readout circuits 260*a*–260*d* are connected to an evaluation circuit 262 which outputs, at an output, a data signal to an A/D converter 264, at the output of which the data transmitted by the light beam are, in turn, output in a digital form. The evaluation circuit 262 may further be configured to utilize the input signals of the HF diode areas A, B, C and D, in a conventional manner, to generate control signals for tracking and focus control and output them at one of several further outputs, as is indicated by the dashed line. For example, the evaluation means 262 may be placed into a corresponding mode in which it may be used, along with the diode array of FIG. 2*a*, like a conventional optical detection means of FIG. 12. The outputs of the readout circuits 260*e* and 260*f* are connected to a control means 266 which outputs, at an output, a crosstalk detection signal to a control input of the A/D converter 264.

The current output signals of the detection diodes 201*a*–205*e* of the diode array 200 are fed, as was mentioned above, to a readout circuit 268, which outputs them in a serial manner to two calculation means 270 and 272, an embodiment of the structure of the readout circuit 268 being explained below in more detail with reference to FIG. 11*a*. The calculation means 270 calculates the actual position of the spot on the diode array of FIG. 2. The calculation means 272 calculates the elliptic degeneration, i.e. its extent and direction, of the spot on the diode array of FIG. 2. The information calculated by the calculation means 270 is fed to a control means 274, which, depending on this information, outputs control signals to suitable actuators for correcting misadjustment and thermal drift and for tracking control, which actuators change the position of the reading head so as to be transverse to the tracks, and change the lateral position of the diode array of FIG. 2*a*, as will be explained below in more detail. The information of the calculating means 272 is output to a control means 276 which, depending on this information, generates control signals for focus control and outputs them to a respective actuator for changing the distance from the optical plate. A control means 278 receives the readout signal of the readout circuit 268 directly and determines from it a control signal for compensating disc tilts and variations in the substrate thickness, as will be explained below, so as to output it to a further control input of the A/D converter.

In the following, the mode of operation of the optical scanning device with the diode array of FIG. 2*a* and the readout and control part of FIG. 2*b*, and its advantageous application and mode of operation will be described against the background of the CD drive into which it is installed.

For data readout, the signals of the HF diodes of areas A, B, C and D are combined by the evaluation means 262, i.e. their output signals are added. The A/D converter digitalizes the combined output signal of the areas A–D on the basis of a threshold value, which the converter obtains from the crosstalk-detect signal from the control means 266, and outputs the digitalized data as the data which are to be read out and are stored in the track to be read out. As was mentioned in the introduction to the description, it is also possible to connect the output signals of the areas, or regions, A–D in a conventional manner to generate control signals for focus and tracking control. Using an astigmatic lens for mapping the reflected data-transmitting light beam to the diode array of FIG. 2*a*, the evaluation means 262 is capable of generating signals for distance and/or focus control by adding the output signals of areas A, B, C and D from the readout circuits 260*a–d* and subtracting the sums from one another, i.e. by forming (A+C)–(B+D), so as to detect the elliptical deformation in the event of defocusing, it being assumed that the main axes of the astigmatic lens extend along the axes x and y indicated in FIG. 2*a*. An actuator subsequently adjusts the distance of the objective lens from the optical plate in accordance with the focus control signal. In addition, the evaluation circuit 262 is capable of generating signals for tracking control, i.e. for controlling the radial movement of the reading head across the rotating optical plate, by evaluating the signal (A+D)–(C+B) characteristic of the so-called push-pull pattern caused by interference of orders of refraction generated by the elevations which acts as a phase grating.

Figure 12:
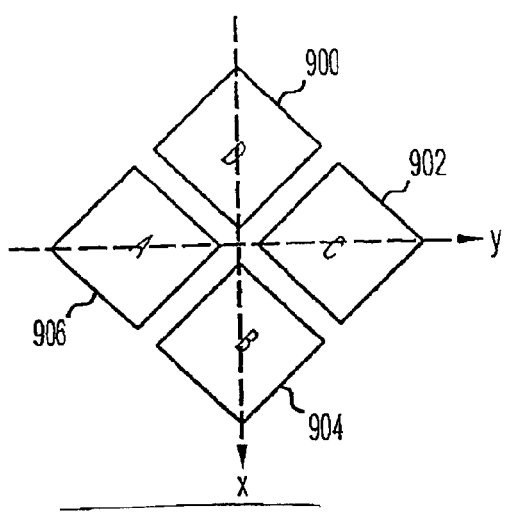
FIG. 12 is a conventional HF diode array as is employed with CD and DVD equipment.
Figure 13:
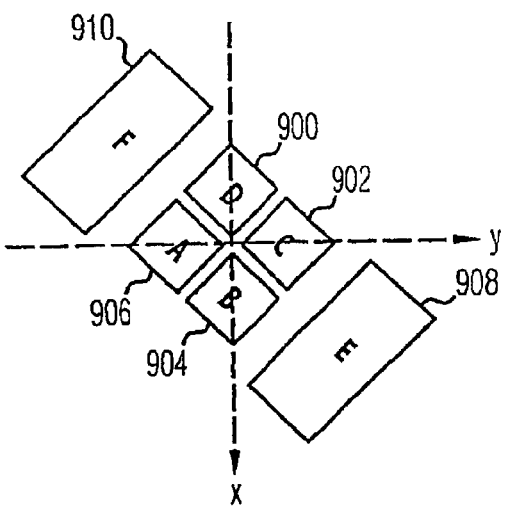
FIG. 13 is a diode array which is alternative to that of FIG. 12, with additional LF diodes for tracking control.

In addition to the signals of areas A, B, C and D, which are also generated by means of the diode array represented in FIG. 12, areas E and F provide further signals. In the present case, these areas are arranged such that they are provided as locations where crosstalk phenomena due to simultaneous readout of two tracks are to be expected, i.e. due to the fact that the readout spot focused onto the optical plate illuminates, with its outer edges, both the actual track to be read out and an adjacent track. In a conventional diode array as shown in FIG. 12, such a crosstalk phenomenon would lead to a stimulation of areas A and B, on the one side, and C and D, on the other side (see FIG. 12), which may give rise to a bit error when offsetting A+B+C+D for data retrieval if a different binary value (pit or non-pit) is present on the adjacent track than on the actual track. By providing the two additional areas E and F, such a stimulation by a crosstalk phenomenon may be detected. To this end, the control means 266 receives the output signals from the readout circuits 260e and 360f and detects whether the output signal of one of the two areas E and F exceeds a threshold value. If this is so, the control means 266 sets the decision threshold for digitalizing the signal A+B+C+D by the A/D converter 264 by the crosstalk-detect signal to be higher, correspondingly, to prevent a bit error, since the crosstalk phenomenon may lead, in the sum signal, to an erroneous intensity value which is too high.

While the combination of the HF diodes 251a–254d to form areas A–F and the use of these combined signals in reading out a track of a CD have been described above, a description will now be given of the utilization of the output signals of the LF diodes 201a–205e, it being assumed, again, that the spot focused onto the track of the CD is mapped by an astigmatic lens with main axes X and Y onto the diode array of FIG. 2, so that too small a distance of the objective lens of the optical means, which focuses the laser beam from the laser diode onto the CD and maps the reflected light beam along the astigmatic lens onto the diode array of FIG. 2, from the CD leads, for example, to an elliptic degeneration along axis y, and so that too large a distance leads to an elliptic degeneration along axis x.

The evaluation of the light beam's intensity distribution detected by the LF diodes 201a and 205e is performed by the calculation means 270, 272 and the control means 274, 276. From the readout signal of the readout circuit 268, which represents the intensity distribution of the detected light beam at the LF diode array, the calculation means 270 calculates a position of the intensity center, or an actual position of the light beam on the diode array of FIG. 2a, and outputs this information to the control means 274, whereas the calculation means 272 determines from this information a form, or an elliptic degeneration, of the laser spot and outputs same to the control means 276. The determinations made by the calculation means 270 and 272 may be ascertained, for example, by means of interpolation or fits and/or adjustment function determination via the intensity values of the LF diodes and a subsequent evaluation, such as search of extremal positions in the case of the determination of the actual position, and analysis of the expansion of a line of identical intensity in the case of the degeneration determination.

By means of the positional information of the spot on the diode array of FIG. 2a, control means 274 generates control and/or servo signals for compensating misadjustments within the reading head, i.e. between laser diode, optical means and/or diode array, as well as thermal drifts between same, and control and servo signals for tracking control. Depending, for example, on a deviation of the laser spot's actual position, calculated by means 270, on the diode array of FIG. 2a from a target position which in the present case is located in the intersection point of the two axes X and Y, control means 274 controls suitable actuators, e.g. piezo-elements, to laterally offset the diode array accordingly, or controls other actuators which adjust the relative position of the reading head transverse to the track to be read out. The possibility of lateral adjustment of the diode array eases the requirements placed upon the production process of a reading head, into which the optical detection device as well as the associated optical means and the laser diode are installed, and thus enables a reduction of cost in the manufacturing of the reading head and/or the CD device. It shall be noted at this point that the matrix of LF diodes 200 may, for this purpose, also be extended across the area of the HF diode matrix 250 so that a larger area for electronic adjustment would result.

Just like misadjustments and thermal drifts, misalignments of the reading head transverse to the track to be read out also lead, as has been mentioned above, to an offset in the actual position of the spot generated by the light beam, to be detected, on the diode array of FIG. 2a. However, with the LF diode array 200 of FIG. 2a, or with the actual position of the spot which is thereby detectable, monitoring the course of this actual position is possible in a sufficiently accurate manner in terms of quantity, so as to enable, again, a forward-looking control and/or servo signal generation for track correction. The more the actual position of the spot deviates from the target position, the more intensely the control means 276 could drive, for example, the actuator responsible for radial displacement of the reading head and/or the offset in the direction transverse to the track, and the more rapidly the deviation increases, the more intense the driving in a forward-looking manner could be on the part of the control means 276.

Disc tilts of the optical plate from a target plane and variations in the substrate thickness on the storage medium, or the optical plate, lead to varying reflections. The mean value of the light intensities detected by LF diodes 201a–205e is therefore used by the control means 278 for taking into account these differing reflection ratios in data retrieval in that the decision threshold for digitalizing the signal A+B+C+D is set to be lower, in the digitalization by the A/D converter, in the case of reduced reflection, and otherwise is set to be higher. This also relaxes the requirements placed upon the manufacturing process of the CD device and the production of the optical plates themselves, and therefore results in cost savings.

As has been mentioned, focus errors lead to an elliptical degeneration of the laser spot on the detection diode array of FIG. 2. The elliptical degeneration may be detected by means of LF diodes 201a–205e and is determined by the determination means 272, so that the control means 276 may set a control signal for focus control and/or a control signal to an actuator for changing a distance of an objective lens from the CD, depending on the detected elliptic degeneration and/or its alignment and its extent.

Figure 3A:
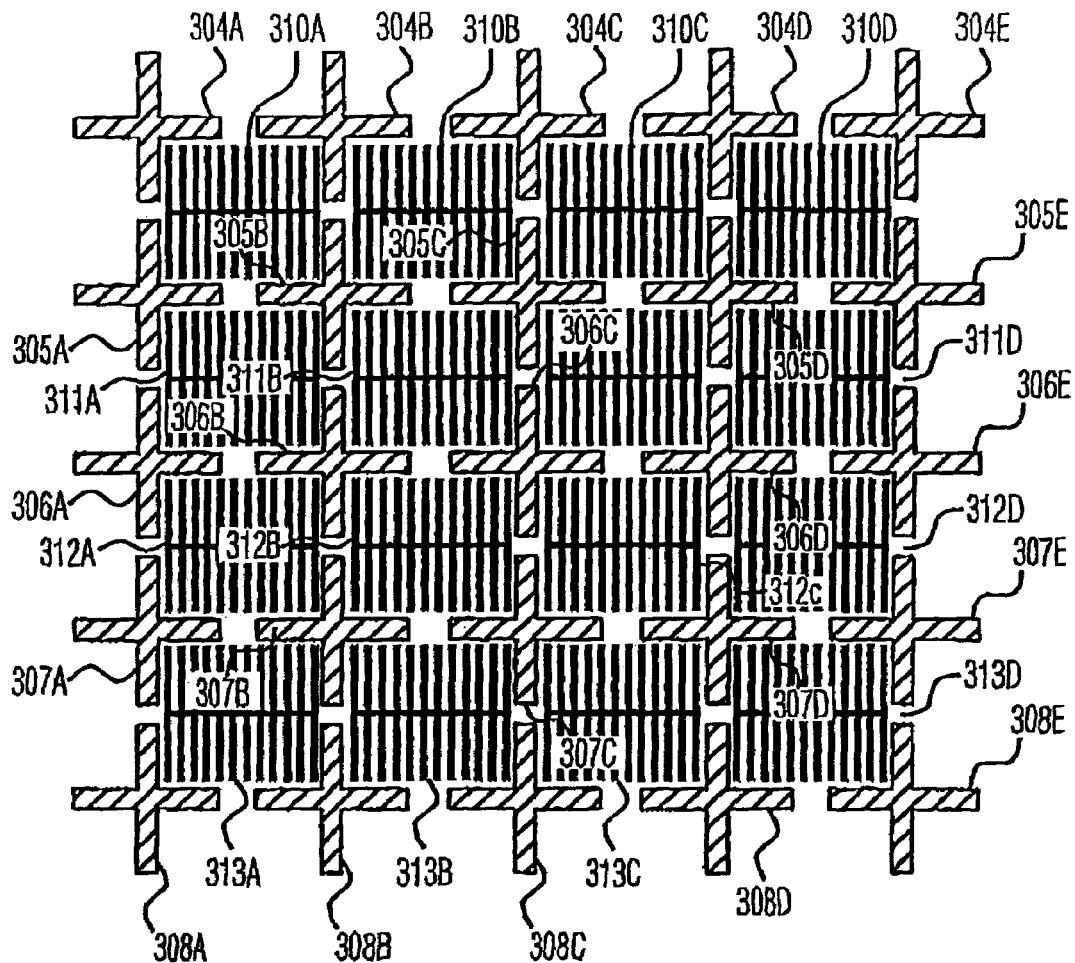
FIG. 3a is an exemplary layout for the diode array of FIG. 2 in accordance with a specific embodiment of the present invention.
Figure 3B:
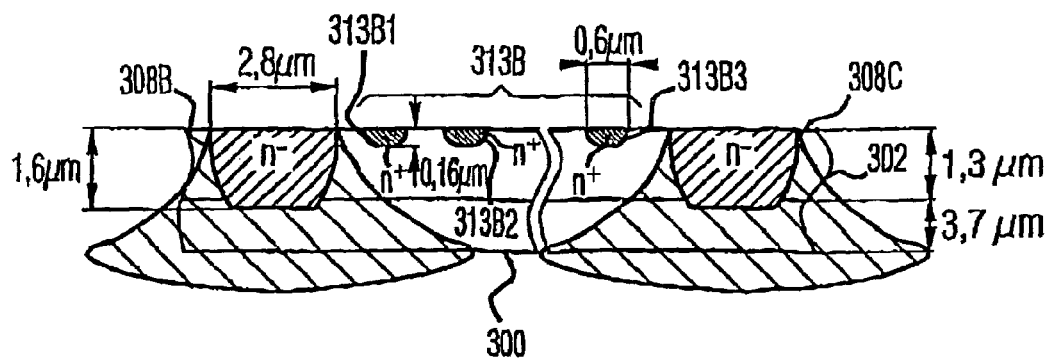

With reference to the following figures, what follows now is a description of an advantageous realization of a diode array of FIG. 2a implemented in CMOS technology, e.g. 0.6 $\mu$m-standard CMOS technology. Initially a description will be given of the layout of the diode array with reference to FIGS. 3a and 3b. FIG. 3a shows a plan view of the diode array, whereas FIG. 3b represents a sectional view along the sectional plane indicated by the dashed line in FIG. 3a. The entire diode array is formed on an epitactic p$^-$-doped silicon (Si—) substrate 300. A p$^-$ trough 302 extends across the entire area occupied by the diode array, and is not represented in FIG. 3a. The LF diodes have been produced in the p$^-$ trough by means of n$^-$ troughs in the form of a cross, and are designated by reference numerals 304a–308e. The n$^-$ troughs 304a–308e extend along the cross-section down to the epitactic p$^-$ substrate 300, as may be seen in FIG. 3b. The HF diodes are formed by double-comb-structured, square n$^+$ diffusion areas in the p$^-$ trough 302 and have been given reference numerals 310a–313d. FIG. 3b shows only the section through the n$^+$ diffusion area 313b, with only three fingers 313b1, 313b2 and 313b3 of the double-comb structure being shown, in particular. The cross-structured n$^-$ troughs 304a–308e extend, with their four arms, between two adjacent n$^+$ diffusion areas 310a–310d, respectively, such that each pair of adjacent n$^+$ diffusion areas is essentially separated by two arms of adjacent n$^-$ troughs, the arms extending towards one another and being spaced apart via a gap. The contactings of the n electrodes of the individual LF and HF diodes may be provided by guiding conductor lines in a suitable manner. As may be seen from FIG. 3b, exemplary dimensions for the layout are as follows: a thickness of 1.6 µm of the n⁻ troughs, a width of 2.8 µm of the four arms of the n⁻ troughs, a depth of 0.16 µm and a width of 0.6 µm of the fingers of the n⁺ diffusion areas, a thickness of 3.7 µm of the epitactic Si substrate 300, and a thickness of 1.3 µm and a depth of 1.3 µm of the p⁻ trough 302. The advantages arising from the lateral forms, the cross-sections and the dopings of the LF and HF diodes formed by the n⁻ troughs 304a–308e and the n⁺ diffusion areas 310a–313d in the p⁻ trough 302, respectively, will be explained below in more detail with reference to FIGS. 4 to 8.

An advantage of the comb-like structure of the n⁺ diffusion areas of the HF diodes is that the penetration depth for wavelengths in silicon in the near-infrared range, i.e. 405 nm, which will be relevant for future generations of storage systems, is about 200 nm, so that the pairs of electron holes are produced mainly on the surface. This means that the pairs of electron holes are separated more effectively by lateral pn junctions, i.e. those portions of the pn junctions wherein the pn interface extends away from the surface in a manner which is essentially perpendicular to the surface, such portions of pn junctions occurring along the circumference of the n⁺ diffusion areas and of the n⁻ troughs. Since the ratio of the length of the circumference to the lateral surface of the n⁺ diffusion areas 310a–313d is particularly high due to the comb structure of the n⁺ diffusion areas 310a–313d, this leads to an improved sensitivity, or response, of the n⁺ diffusion areas 310a–313d, and/or of the stripe-shaped diode fingers 313b1–313b3 in this wavelength range as compared to more compact structures.

Figure 5:
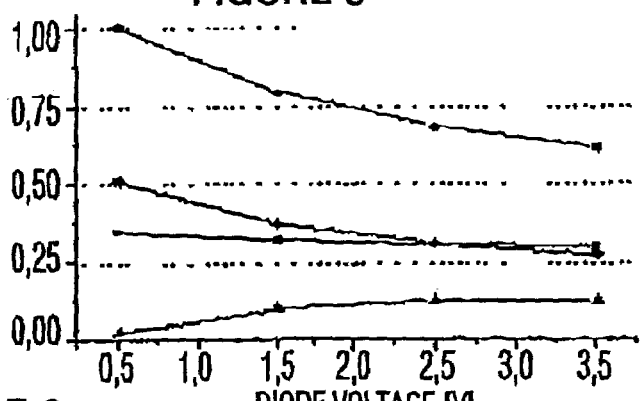
FIG. 5 depicts a graph showing the area and circumferential capacity of the HF and LF diodes in the diode array of FIG. 3a as a function of the diode voltage so as to represent the improved capacitance per unit length of the surface and the edge.

A further advantage of the comb-like structure of the n⁺ diffusion areas 310a–313d is that they exhibit a low photodiode capacitance. This is advantageous since they are to enable as fast a readout as possible, and since this leads to an increased bandwidth in the readout performed by means of transimpedance amplifiers, as will be described with reference to FIGS. 9 and 10. Thus, in the event that a transimpedance amplifier with a high bandwidth of, e.g., up to 250 MHz and a high transimpedance of, e.g., up to 200 kΩ is used for readout, the bandwidth $f_{-3\,dB}$ of the readout system consisting of the transimpedance amplifier and the diode will depend, for example, on the photodiode capacitance $C_{diode}$ as follows:

$$f_{-3dB} \propto \frac{A}{2\pi R_f} \cdot \frac{1}{C_{diode}}$$

wherein $R_f$ represents the transimpedance, and A represents the direct current amplification of the transimpedance amplifier, and $C_{diode}$ represents the photodiode capacitance. To achieve high bandwidths, as is desirable for the HF diodes in charge of data retrieval, it is therefore required to keep the interface capacitance of the diode to be read out as low as possible to minimize the requirements placed upon the transimpedance amplifier. FIG. 5 shows that the double-comb structure of the n⁺ diffusion areas 310a–313d of the HF diodes leads to a reduction of the photodiode capacitance. In FIG. 5, the area capacitance of the HF diodes is plotted in units per unit of area (indicated by round dots), and the circumference and/or side-wall capacitance of same is plotted in units per unit of length (indicated by squares) versus the diode voltage V across the HF diodes. As can be seen, the comb structure of the HF diodes promotes a lower diode capacity due to the higher circumference/surface-area ratio, so that the achievable bandwidth of the readout system, which will be described below in more detail with reference to FIGS. 9 and 10, is accordingly higher.

The advantages of the trough structure of the LF diodes mainly consist in the fact that this structure leads to a larger vertical (depth) expansion of the trough in comparison with that of the n⁺ diffusion areas. In addition, the lateral shape of the n⁻ troughs 304a–308e as crosses causes each HF diode to be almost fully surrounded by the arms of four adjacent n⁻ troughs 304a–308e. In all, hereby a kind of protective ring for these HF diodes is formed both in a lateral and, due to the deep cross-section of the n⁻ troughs, in a vertical direction. For if charges are generated along the circumference of an HF diode, they are captured by an LF diode 304a–308e rather than an adjacent HF diode, which consequently results in a crosstalk separation in the lateral direction between the HF diodes. Diffusive charge carriers in the epitaxial layer 300 which were not captured by the HF diodes are captured by one of the adjacent LF diodes, so that they cannot diffuse to another adjacent HF diode, which will be referred to, for the present application, as a vertical crosstalk separation of the HF diodes. This leads to an increased resolution of the spatial intensity distribution detected by the HF diodes.

A further advantage of the above-described "drawing-off" of diffusive charge carriers by the LF diodes is that these diffusive charge carriers would blur the pulse form of the diode response due to their diffusion time, and would thus lead to a lower data readout speed. Since the LF diodes are read out at lower frequencies in the kHz range, the readout having been mentioned briefly above and being explained in more detail below with reference to FIG. 11a, the slow diffusion current captured by the LF diodes, however, has no impact, conversely, on the detection of the intensity distribution of the incident light beam on the part of the LF diodes, which, as has been described above, may be used for controlling the alignment of the light beam to be detected with the detection window. It shall be expressly pointed out that the "drawing-off" of diffusive charge carriers by the LF diode troughs 304a–308e, as has just been described, leads to a shielding of the signal-detecting space charge regions of the HF diodes 310a–313d both from a lateral and a vertical point of view. The lateral shielding was described above within the framework of the crosstalk-protection action of the LF diode troughs 304a–308e. Vertical shielding occurs due to bulging of the space charge zones configured by the LF diode troughs 304a–308e, which zones are represented at 328b and 328c, in the side-sectional representation of FIG. 3b, for the diode areas 308b and 308c. The bulging of the space charge zones 328b and 328c, which increases as the depth increases, results from a doping profile of substrate 300, which has a doping density decreasing with a predetermined doping gradient, and also results from the simulation of FIG. 4 which will be described below. The large-scale expansion of the space charge zones 328b and c is also assisted by the weak doping of the LF diode troughs compared to the highly doped HF diodes, and by the depth expansion of the LF diode troughs 304a–308e which is ten times larger compared to the HF diode areas 310a–313d.

Forming the LF diodes by n⁻ troughs instead of n⁺ diffusion areas is advantageous in that a smaller capacitance value is achieved. To illustrate this, the side-wall photodiode capacitance (indicated by rhombs) and the surface photodiode capacitance (indicated by triangles) are also plotted against the diode voltage V in the graph of FIG. 5 for the case of n⁻ trough diodes with a structure which is otherwise identical to the diode structures on which the n⁺ diffusion area diode capacitance values, shown in FIG. 5, are based. As can be seen, the capacitance of an n⁻ trough diode is lower in comparison with an n⁺ diffusion diode. In addition, the cross shape of the n⁻ troughs 304a–308e reduces the diode capacitance due to the higher circumference/surface-area ratio. The reduction of the diode capacitance achieved by the choice of the structure of the LF diodes, in turn, results in a lower signal/noise ratio with the LF diode readout. Thus, in the case of an integrative readout of the n⁻ trough LF diodes, as will be explained below in more detail with reference to FIG. 11a, wherein the LF diodes are read out by integration and the photocurrent is integrated at the intrinsic interface capacitance of the photocurrent, the following formula applies to the signal/noise ratio of such a readout system:

$$S/N\text{-ratio} = 20 \log \left( \sqrt{\frac{I_{ph}^2 T_{int}^2}{e^{-}(C_{diode} U_{Th} + I_{ph} T_{int})}} \right)$$

Here, $T_{int}$ is the integration time and $U_{Th}$ is the threshold value voltage of that transistor which is provided to set the LF diode to a defined potential at the start of an integration cycle, $I_{ph}$ is the photocurrent of the diode, and $C_{diode}$ is the photodiode capacitance. Consequently, the signal/noise ratio increases with decreasing diode capacitance, which is an additional advantage of the cross-structured n⁻ troughs.

Figure 4:
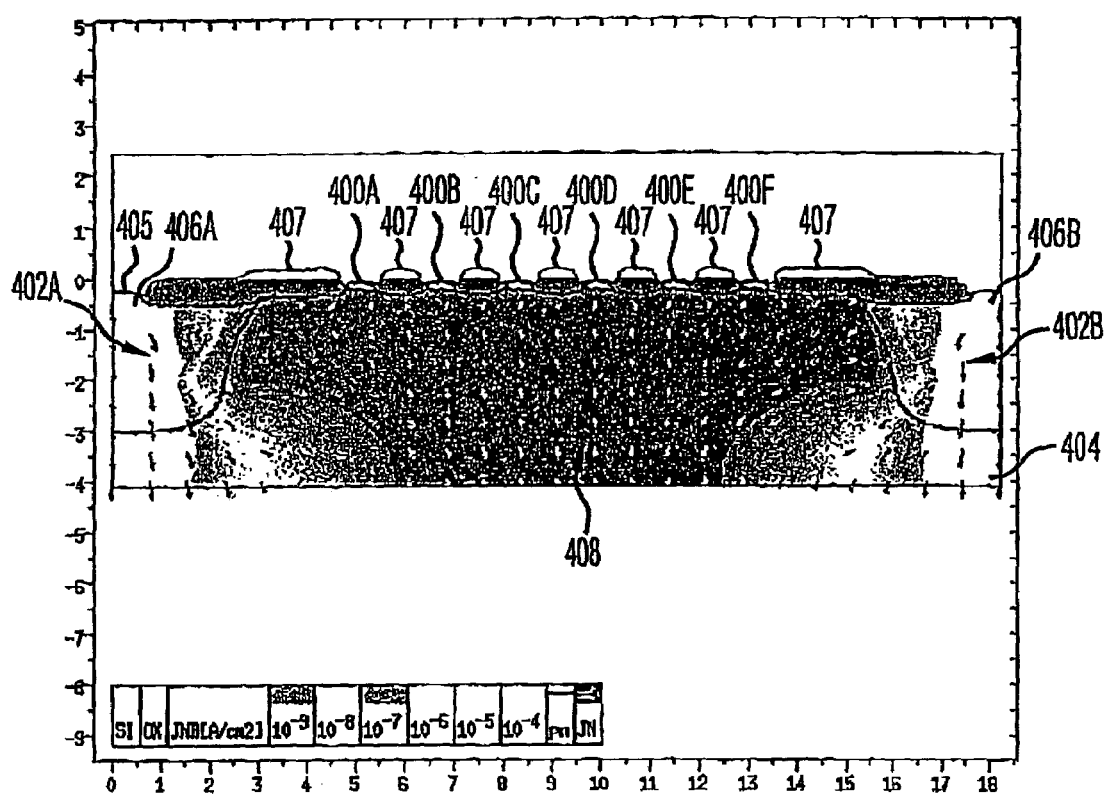
Figure 8:
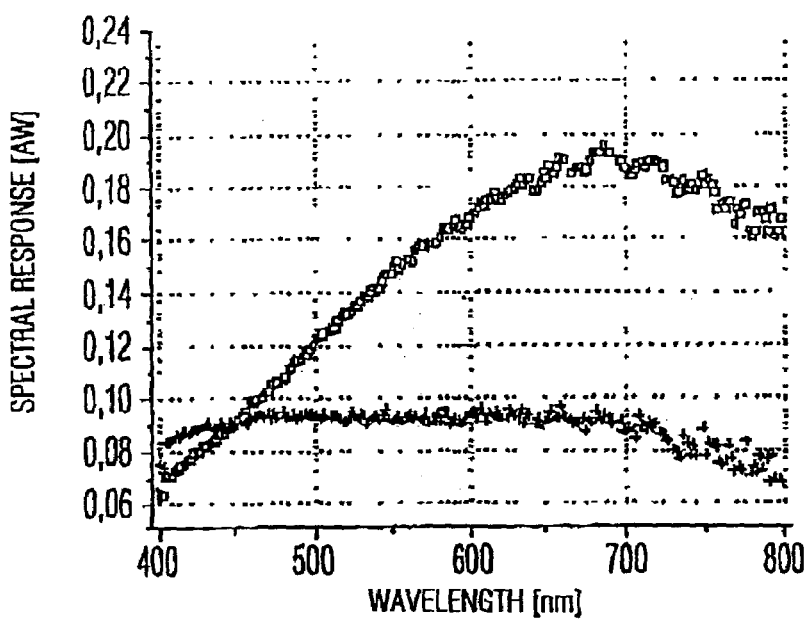
FIG. 8 is a graph showing the spectral response of the diodes of the diode array in accordance with FIG. 3a with a simultaneous readout.

With the help of a simulation program, a simulation of the current density of thermally generated minority charge carriers as an indication of optically induced charge carriers was performed along a sectional plane which corresponds to the cross-section of FIG. 3b except for the number of figures of the double-comb-structured n⁺ diffusion areas. The result of this simulation is shown in FIG. 4, where the direction and length of the equidistantly arranged arrows indicate the direction and the amount of the dark current at the respective locations, and where the scales of figures arranged on the left-hand bottom side of the image are indications of the length in micrometers. The amount of the dark current is also illustrated by the dashed contour lines, or shading. FIG. 4 shows several HF-diode n⁺ diffusion areas 400a, 400b, 400c, 400d, 400e and 400f surrounded by two LF-diode n⁻ troughs 402a and 402b in an epitactic p⁻ substrate 404 provided, for simulation purposes, without p⁻ trough. For contacting the n⁻ troughs 402a, 402b, n⁺-doped trough contact areas 406a and 406b are provided on the surface. Field oxide is indicated at 407 and is located on the surface 405. Solid lines are used to indicate a resulting conductivity transition of the HF diodes between the n⁺ areas 400a–400f. As may be seen from FIG. 4, the simulation results in that the space charge zone expands almost fully up to just underneath the HF diode fingers 400a–400f, which enables vertical shielding of the latter against diffusive charge carriers generated in deeper regions, and thus enables the higher bandwidth of the HF diodes due to the increased drift-current portion and the decreased diffusion-current portion. The arrows representing the dark current, which have been calculated by the simulation at equidistant positions, serve as a measure for the course of charge carriers generated by light. As may be seen, only a small portion of the charge carriers, which are generated deeper down than 2 μm, gets to the HF diode fingers 400a–400f, so that the photocurrent with them consists substantially of drift current, which represents an improvement in the speed compared with HF diodes not shielded by surrounding LF diodes since, as has been mentioned above, charge carriers generated deeper produce a long time skew between generation and detection, the long time skew being due to their long diffusion path. The reason for the low diffusion current is that the LF diodes 402a and 402b draw off most minority charge carriers below a depth of 2 μm below the Si/SiO₂ surface. Only the median part 408 underneath the HF diodes 400a–400f captures charge carriers which were generated in deeper regions. As may also be seen, charge carriers are effectively prevented from diffusing to adjacent n⁺ HF diode fingers of adjacent HF diodes, so that good crosstalk separation is achieved.

From the above considerations, a further advantage due to the "drawing off" of the diffusion stream by the LF diodes surrounding the HF diodes because of their cross structure is evident. If one considers that the penetration depth of light for the wavelength of 405 nm, the wavelength of future optical storage systems, is 0.196 μm, for light of the wavelength of 650 nm, the operating wavelength of DVD devices, is 2.89 μm and of light of the wavelength of 780 nm, the operating wavelength of CD-ROM devices, is 8.0 μm, it can be seen from the simulation of FIG. 4 that by irradiation with wavelengths of 650 nm and 780 nm, the charge carriers generated do not contribute to the photocurrent of the HF diode fingers 400a–400f. Consequently, at a fixed optical power, the amount of photocurrent of the HF diodes is less sensitive towards the respective wavelength of the light. Consequently, the presence of the LF diodes in the above-described n⁻ trough shape has a linearizing effect with regard to the spectral response of the HF diodes. This linearization effect may also be seen from FIG. 8, which shows a graph wherein the spectral response of the LF diodes (indicated by little squares) and HF diodes (indicated by little crosses) are plotted versus the wavelength. Both curves represent the spectral response of the HF and/or LF diodes in the event of a simultaneous readout of these diodes, as is the case during the operation of the optical scanning device of FIGS. 2a and 2b. As may be seen, the LF diodes show the typical spectral response behavior of photodiodes: since the recombination rate of charge carriers at the surface is generally higher than with charges generated deeper down, the spectral response and/or sensitivity of the diodes increases as the wavelength increases. From a certain wavelength onwards, which is about 650 nm in the present case, the diffusive charge carriers, however, no longer reach the space charge zone of the LF diodes before recombining, which is due to the fact that the penetration depth of light into the semiconductor substrate increases as the wavelength increases. Subsequently, from 650 nm onwards, a drop in the sensitivity for the higher wavelengths results. The characteristic curve of the HF diodes, however, differs fundamentally from that of the LF diodes. As can be seen, they only exhibit a small rise of 0.008 A/W in the range of 400 nm to 460 nm. From 460 nm to 700 nm, the sensitivity of the HF diodes remains nearly constant and drops only by 0.21 A/W in the interval of from 700 nm to 800 nm. If one considers that the amplification of a transimpedance amplifier, which, as has already been mentioned above several times and will be described below in detail, is used to readout the HF diodes, with active feedback is typically exposed to fluctuations of ±5% due to non-linearities of the transistors which are partly used in the triode region and which are used for its construction, the spectral response of the HF diodes may be considered to be nearly linear. This results in a readout system with a nearly constant amplification for all wavelengths. Due to the rough surface of the finger diode structure of the HF diodes, and due to the resulting varying oxide thicknesses, the HF diodes furthermore do not exhibit an interference phenomenon in the wavelength range of 650 nm to 800 nm, as is the case with the LF diodes, wherein the interference phenomenon with these wavelengths has a slight impact on the spectral response function. What is also advantageous about the HF diode structure is, as may be seen from FIG. 8, that the HF diodes for wavelengths in the near-ultraviolet range, i.e. for wavelengths of future optical storage systems, have a relatively better sensitivity.

Figure 6:
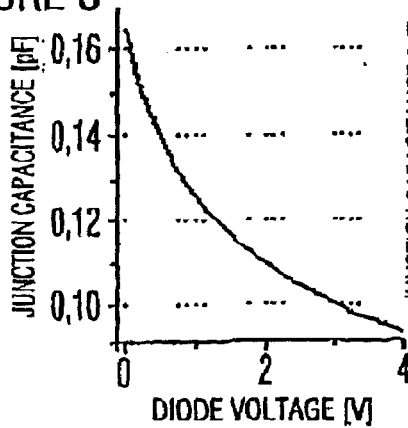
FIG. 6 is a graph showing the transition capacitance of an HF diode of the diode array of FIG. 3a as a function of the diode voltage.
Figure 7:
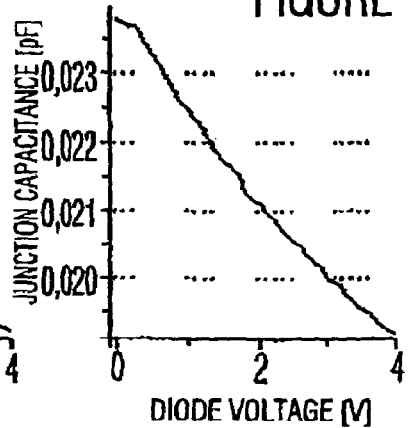
FIG. 7 is a graph showing the transition capacitance of an LF diode of the diode array of FIG. 3a as a function of the diode voltage.

For completeness' sake only, two graphs are shown in FIGS. 6 and 7, which are plotted across the diode voltage and represent the capacitance of a single HF diode (FIG. 6) and LF diode (FIG. 7). As may be seen, the absolute capacitance of the HF diodes reaches from 98 femtofarad at 3.3 V to 165 femtofarad at 0.1 V. This is a range of values which may simply be read out using a transimpedance amplifier for readout. The variation of the capacitance is no problem, since the voltage across the diode is kept constant by the readout circuit. The absolute value of the junction capacitance of the LF diodes ranges between 19.7 femtofarad and 22.4 femtofarad in a voltage range of 3.3 V to 1 V, which represents the range wherein the integration of the photocurrent is performed in the readout circuit of FIG. 11a which is to be described below.

After an embodiment of a hardware realization of the diode array of FIGS. 2a, 2b was described above with reference to FIGS. 3–8, an embodiment of potential readout circuits of the LF and/or HF diodes will be described below with reference to FIGS. 9–11, of which FIGS. 9 and 10 initially relate to the readout of the HF diodes, whereas FIG. 11a deals with the readout of the LF diodes.

FIG. 9 diagrammatically shows the base configuration of the readout of an HF diode and/or of HF diodes combined to form an HF diode area, and/or HF diodes connected in parallel, the HF diode and/or HF diode region to be read out being indicated by reference numeral 500 and generating the photocurrent $I_{ph}$. The HF diode is connected between reference potential 502 and an input of a transimpendance amplifier 504, the structure of which will be explained below in more detail using an exemplary embodiment with reference to FIG. 10. The impedance $Z_f(s)$ represents the impedance of the feedback branch of the transimpedance amplifier 504, whereas $Z_i(s)$ represents the source impedance. $U_0$ is the output voltage at the output of the transimpedance amplifier 504. An analysis of the basic configuration of FIG. 9 results in the transfer function of this configuration to form $$\frac{U_0}{I_{ph}} = \frac{A(s) Z_f(s) Z_i(s)}{Z_i(s)(A(s)-1) - Z_f(s)}$$

wherein A(s) indicates the amplification of the trans-impedance amplifier 504. In the event of an ideal amplifier with infinite amplification, this equation $U_0=Z_f(s)$ results in $I_{ph}$, which indicates that the photocurrent $I_{ph}$ is converted into a voltage by the factor of $Z_f(s)$.

In the event that CMOS technology is used for implementation, $Z_f(s)$ may be regarded as an ohmic resistance value $R_f$, whereas $Z_i(s)$ may be regarded as a capacitive value composed of the gate capacitance $C_g$ of an input transistor of the transimpedance amplifier, and the junction and/or interface capacitance of the HF diode 500 $C_d$. s is a variable for the readout frequency. Assuming that the transimpedance amplifier 504 has a sufficiently high bandwidth, i.e. A(s)=A, and in view of the above assumptions and/or considerations, the formula mentioned last results in $$\frac{U_0}{I_{ph}} = \frac{AR_f}{(A-1)\left(1 - \frac{s(C_g + C_d)R_f}{A-1}\right)}$$

From this equation, the −3 dB bandwidth results in $$f_{-3dB} = \frac{1-A}{2\pi(C_g + C_d)R_f}$$

The latter equation shows that the −3 dB bandwidth of the HF readout is mainly determined by three parameters: the −3 dB bandwidth increases as the amount of the amplification A increases, A having to be negative for reasons of stability. In addition, the −3 dB bandwidth decreases as the feedback resistance value or input capacitance increases. A feedback resistance value of 63 kΩ, and a voltage amplification value of 30 resultin a bandwidth of, e.g., 142 MHz.

FIG. 10 shows an embodiment of the transimpedance amplifier 504, which presently is a single-ended input amplifier which, compared to a standard operation amplifier as is used in most optical pickup units, exhibits an improved noise performance due to the smaller number of input transistors. The transimpedance amplifier of FIG. 10 includes three amplification branches 600, 602 and 604, and a feedback path 606. Each of the amplification branches 600–604 is identical in structure except for parameter quantities of the devices, which is why the structure will be described below only with reference to the first amplification branch 600. The first amplification stage comprises a pMOS transistor $M_2$, the gate of which is connected to the bias terminal $v_{bias}$, and the source (drain) terminal of which is connected to supply voltage potential 607. The second amplification stage consists of two nMOS transistors $M_1$ and $M_3$. the gate terminal of transistor $M_1$ is connected to an input $I_{in}$ of the transimpedance amplifier. The drain (or source) terminal of transistor $M_2$ is connected to the drain (or source) terminal of transistor $M_1$ as well as to the gate and to the drain (or source) terminals of transistor $M_3$. The source terminals of nMOS transistors $M_1$ and $M_3$ are connected to ground and reference potential 608, respectively. The drain terminal of transistor $M_2$ is further connected to the gate terminal of transistor $M_1'$ of the subsequent amplification stage 602. Similarly, the drain terminal of transistor $M_2'$ of the second amplification stage 602 is connected to the gate terminal of transistor $M_1''$ of the third amplification stage 604. The drain terminal of pMOS transistor $M_2''$ of the third amplification stage is connected to input $I_{in}$ via feedback path 606. A source/drain stretch of a pMOS transistor $M_4$ and an nMOS transistor $M_5$ is connected into the feedback path 606. The gate terminal of pMOS transistor $M_4$ is connected to ground, whereas the gate terminal of nMOS transistor $M_5$ is connected to an $R_f$ control terminal of the transimpedance amplifier. The drain terminal of pMOS transistor $M_2''$ of the third amplifier stage is further connected to an output $V_{out}$ of the transimpedance amplifier at which the output voltage $U_0$ (see FIG. 9) is applied.

To keep the transistors in saturation for larger input currents at the input $I_{in}$, the second amplification stage 602 may be altered in comparison with the other amplification stages 600 and 604 with regard to device-specific parameters, such as the gate length. Since the parasitic capacitance of an ohmic feedback resistance value considerably reduces the bandwidth of the system, active feedback by transistors $M_5$ and $M_4$ has been selected instead. The actual amount of the resistance value is set by the voltage at the input $R_{f\_}$control via nMOS transistor $M_5$. pMOS transistor $M_4$ serves for linearization.

It is to be noted that a voltage amplifier may be connected at the output of the transimpedance amplifier V_out to amplify the output voltage $U_O$ (see FIG. 9) to obtain a sufficient voltage swing and to drive the signals from, e.g., the CMOS chip. To this end, the bandwidth of this subsequent voltage amplifier should preferably be selected such that it does not have a negative influence on the −3 dB bandwidth of the HF readout, discussed above, of the transimpedance amplifier configuration.

Figure 11A:
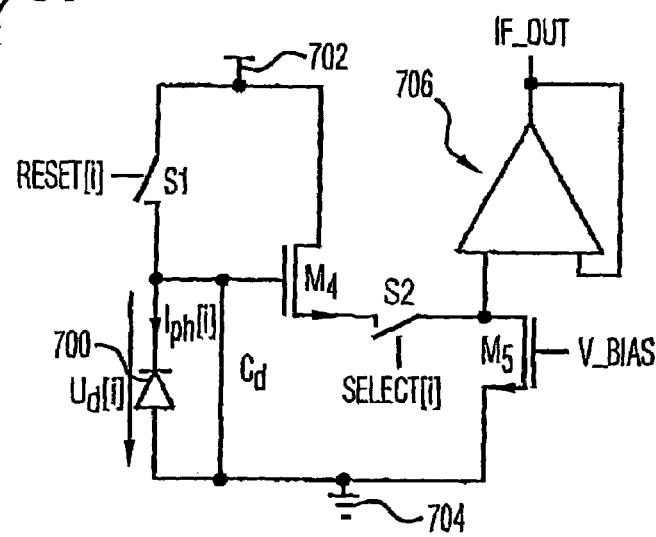
FIG. 11a is a readout circuit of the readout of the LF diodes of the embodiment of FIG. 2.

FIG. 11a shows the LF readout circuit for reading out the LF diodes. Since the readout is performed in the kHz range, an integration approach is selected, with the barrier layer capacitance of the LF diodes being used to integrate the photocurrent.

Initially it shall be pointed out that in FIG. 11a, only a part of the readout circuit of the LF diodes is shown which is responsible for reading out an LF diode indicated below by reference numeral 700, and that only this part will initially be described below. The LF diode 700 is reverse-corrected in series with a switch S1 between a supply potential 702 and ground and/or reference potential 704. In the equivalent circuit diagram of FIG. 11a, dashed lines indicate the barrier-layer or junction capacitance $C_d$ of the LF diode 700 as a capacitor connected in parallel with the LF diode 700. The interconnection between LF diode 700 and switch S1 is connected to a gate of an nMOS transistor $M_4$, the drain terminal of which, in turn, is connected to the supply potential 704. The source terminal of transistor $M_4$ is connected to an input of an output amplifier 706 via a switch S2. An nMOS transistor $M_5$ with its source/drain stretch is connected between the input of the output amplifier 706 and ground 702, whereas its gate terminal is connected to an input v_bias. With the switch S2 closed, transistors $M_4$ and $M_5$ together form a source follower.

After the structure of the part of the readout circuit for an LF diode 700 has been described above, its mode of operation will be described below. The voltage applied across the LF diode 700, $U_d[i]$, is initially set to the supply voltage $V_{dd}$ by switching on switch S1. As soon as switch S1 is open, the voltage $U_d[i]$ across the interface capacitance $C_d$ of the LF diode 700 decreases due to the discharge of the photodiode capacitance $C_d$ by the photocurrent. The following is true for the dependence between voltage $U_d$ and time:

$$U_d[i] = V_{DD} - \frac{1}{C_d}\int_{t_{reset}}^{t} I_{ph}[i](\tau)\,d\tau$$

it being assumed that the diode capacitance $C_d$ is independent of $U_d[i]$, $t_{reset}$ indicates the point in time when switch S1 is opened, t indicates the current point in time, and τ is an integration variable. It may be seen that the voltage swing increases as $C_d$ decreases. $U_d[i]$ is the input voltage to the unity-gain amplifier formed by transistors $M_4$ and $M_5$, the unity-gain amplifier being switched by switch S2. The voltage applied at the source terminal of transistor $M_5$ of the unity-gain amplifier is amplified by the output amplifier 706 so as to drive out the voltage read out.

Figure 11B:
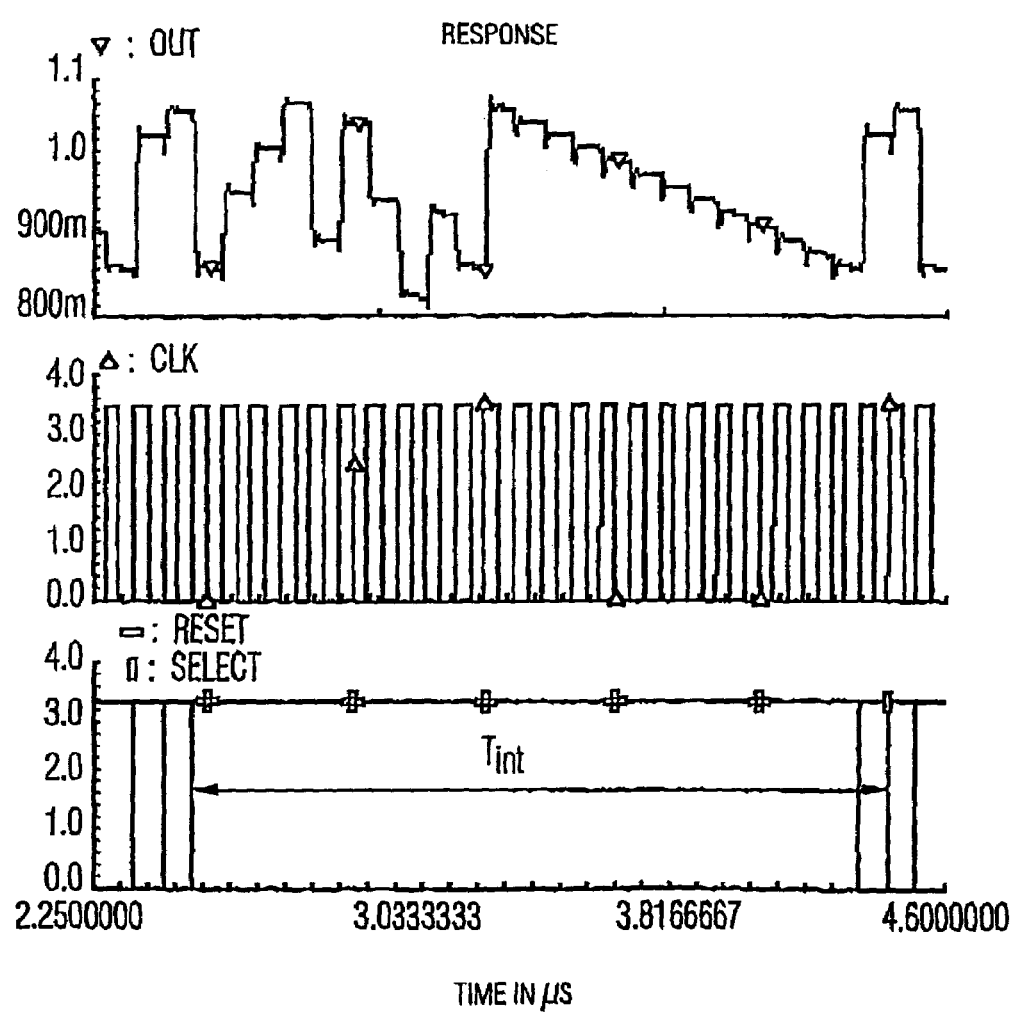
FIG. 11b shows exemplary wave forms of signals occurring in the circuit of FIG. 11a, for illustrating the cascade-type readout of the LF diodes.

For reading out all LF diodes, the readout circuit includes a switch S1, a switch S2 and a transistor $M_4$ for each LF diode. Switches S1 and S2 are controlled by the signals reset (i) and select [i]. The timing scheme for the select and reset signals is such that pulses are generated which are shifted in phase in a regular manner from an input clock 25. The $i^{th}$ pulse is used to direct the diode voltage of the $i^{th}$ LF photodiode to the output amplifier 706 for the duration of an input clock period. The $(i+1)^{th}$ pulse is used to reset the $i^{th}$ LF photodiode. Consequently, signals reset and select are applied in a cascade-like manner to each LF photodiode of the 5×5 LF diode array, the signals having a pulse at each $25^{th}$ clock period, the pulse of the reset signal immediately following the pulse of the select signal for each LF diode. Consequently, 23 clock periods elapse between the resetting of each LF diode and the time of its readout, the present photocurrent being added to the stored one during the readout and/or the multiplexed forwarding. The reset and/or select signals of all 25 LF diodes are each offset in relation to one another by one clock period, so that all 25 LF diodes are read out in a serial and/or cascade-like manner. The output amplifier, or output buffer, is preferably designed such that its build-up time is shorter than half the clock period. The clock rate may be, e.g., 25 MHz. In this case, the descending clock pulse edge may be used to scan the output signal of the unity-gain amplifier. In order to illustrate the readout scheme, FIG. 11b shows, in three graphs arranged one above the other, examples of wave forms of the output signal if_out of the amplifier 706, a clock clk for cascade multiplex control and, in the bottommost graph, reset and select for an LF diode.

This multiplex readout operation of the LF diodes ensures that for all LF diodes only one output buffer 706 as well as only one pin and/or only one pad is required in the implementation of the optical detection device of FIGS. 3–11 as an integrated circuit.

With reference to the above description of FIGS. 2–11 it shall be pointed out that the diode array of FIG. 2a may be integrated with one or several or all of the means of FIG. 2a to form an optical detection means in the form of, e.g., a chip.

With reference to the above description it shall be pointed out that the conductivity types described, i.e. n-conductive and p-conductive, may also be reversed, and that additionally, other arrangements of the LF diodes as an array are also possible.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An optical detection device for detecting an intensity of a light beam in a detection window and for detecting data transmitted by the light beam, comprising
    an array having a plurality of first detection diodes in the detection window;
    an array having a plurality of second detection diodes in the detection window;
    a first readout circuit connectable to the first detection diodes, for reading out the first detection diodes at a first readout speed to yield the data; and a second readout circuit connectable to the second detection diodes, for reading out the second detection diodes at a second readout speed lower than the first readout speed, to determine the intensity of the light beam, wherein the array of first detection diodes is an n×n array, and the array of second detection diodes is an (n+1)×(n+1) array, both arrays being arranged such that the first detection diodes are arranged in the gaps of the array of second detection diodes.

2. The optical detection device as claimed in claim 1, wherein the plurality of first detection diodes are connected in parallel to be jointly read out by a first evaluation circuit.

3. The optical detection device as claimed in claim 1, wherein the plurality of second detection diodes are connected in parallel.

4. The optical detection device as claimed in claim 1, further comprising:
an evaluation circuit for determining an actual position of the light beam from the intensity, detected in the detection window, of the light beam at the second detection diodes.

5. The optical detection device as claimed in claim 1, wherein the first detection diodes has an area structured in a comb-like manner, with a first kind of doping, and a trough with a second kind of doping, wherein the area structured in a comb-like manner is embedded.

6. The optical detection device as claimed in claim 5, wherein the area structured in a comb-like manner has an $n^+$-doped area, and the trough is $p^-$-doped.

7. The optical detection device as claimed in claim 5, wherein the second detection diodes have an $n^-$-doped area formed in the same trough.

8. The optical detection device as claimed in claim 1, wherein the array of first detection diodes is an n×n array, and the array of second detection diodes is an (n+1)×(n+1) array, wherein the two arrays are arranged such that the first detection diodes are arranged in the gaps of the array of second detection diodes, and wherein the $n^-$-doped area of each second diode is formed in a cross shape with four arms, each of which projects into an area between two adjacent first detection diodes to separate them in terms of diffusion current.

9. The optical detection device as claimed in claim 1, wherein the first readout circuit comprises a transimpedance amplifier.

10. The optical detection device as claimed in claim 1, wherein the second readout circuit comprises:
a connector for serially connecting every second detection diode to a supply voltage to charge a diode junction capacitance of the second detection diode so that a voltage across the second detection diode corresponds to the supply voltage, and for subsequently separating the second detection diode from the supply voltage, and for serially outputting the voltage applied across every second detection diode once an integration period has expired after the separation from the supply voltage.

11. An optical scanning device for reading out a track of an optical plate by detecting the light beam reflected from a track and modeled in accordance with data stored on the track, comprising
an optical detection device for detecting an intensity of a light beam in a detection window and for detecting data transmitted by the light beam, comprising
an array having a plurality of first detection diodes in the detection window;
an array having a plurality of second detection diodes in the detection window;
a first readout circuit connectable to the first detection diodes, for reading out the first detection diodes at a first readout speed to yield the data; and
a second readout circuit connectable to the second detection diodes, for reading out the second detection diodes at a second readout speed lower than the first readout speed, to determine the intensity of the light beam, wherein the array of first detection diodes is an n×n array, and the array of second detection diodes is an (n+1)×(n+1) array, both arrays being arranged such that the first detection diodes are arranged in the gaps of the array of second detection diodes; and
a controller for outputting control signals for tracking and/or focus control depending on the detected intensity of the light beam at the second detection diodes.

12. The optical scanning device as claimed in claim 11, wherein the controller further comprises:
a determinator for determining a deviation of an actual position of the light beam in the detection window from a target position in the detection window from the detected intensity of the light beam at the second detection diodes; and
a calculator for calculating a control signal for tracking and/or focus control from the deviation, such that the deviation is reduced.

13. The optical scanning device as claimed in claim 11, wherein the deviation determined is established in two dimensions.

14. The optical scanning device as claimed in claim 11, wherein the controller comprises:
a determinator for determining an extent of a simultaneous readout of two adjacent tracks from the detected intensity of the light beam at a part of the first detection diodes; and
a determinator for determining a control signal for setting the threshold value for digitalizing the data detected from the extent determined, such this bit errors in the digitalization are reduced.

15. An optical storage device, comprising
an optical plate having an optical track which has data stored thereon;
a light-beam generator for generating the light beam;
an optical scanning device for reading out a track of an optical plate by detecting the light beam reflected from a track and modeled in accordance with data stored on the track, comprising
an optical detection device for detecting an intensity of a light beam in a detection window and for detecting data transmitted by the light beam, comprising
an array having a plurality of first detection diodes in the detection window;
an array having a plurality of second detection diodes in the detection window;
a first readout circuit connectable to the first detection diodes, for reading out the first detection diodes at a first readout speed to yield the data; and
a second readout circuit connectable to the second detection diodes, for reading out the second detection diodes at a second readout speed lower than the first readout speed, to determine the intensity of the light beam, wherein the array of first detection diodes is an n×n array, and the array of second detection diodes is an (n+1)×(n+1) array, both arrays being arranged such that the first detection diodes are arranged in the gaps of the array of second detection diodes; and a controller for outputting control signals for tracking and/or focus control depending on the detected intensity of the light beam and the second detection diodes;

optics for focusing the light beam onto the track and for directing a light beam which has been reflected from the track to the detection window of the optical detection device;

a carrier for carrying the first and second detection diodes of the optical detection device, the light-beam generator and the optics; and a servo for setting a distance between the carrier and the track, and a lateral position of the carrier in relation to the track, depending on the control signal for tracking and focus control from the optical scanning device.

16. A method of operating an optical detection device for detecting an intensity of a light beam in a detection window and for detecting data transmitted by the light beam, the optical detection device having an array having a plurality of first detection diodes and an array having a plurality of second detection diodes in the detection window, wherein the array of first detection diodes is an n×n array, and the array of second detection diodes is an (n+1)×(n+1) array, both arrays being arranged such that the first detection diodes are arranged in the gaps of the array of second detection diodes, the method comprising:

reading out the first detection diodes at a first readout speed to yield the data; and reading out the second detection diodes at a second readout speed, smaller than the first readout speed, to determine the intensity of the light beam.

* * * * *